US008737698B2

(12) United States Patent
Mil'Shtein et al.

(10) Patent No.: US 8,737,698 B2
(45) Date of Patent: May 27, 2014

(54) CIRCUMFERENTIAL CONTACT-LESS LINE SCANNING OF BIOMETRIC OBJECTS

(75) Inventors: Samson Mil'Shtein, Chelmsford, MA (US); John Palma, Dedham, MA (US); Christopher Liessner, Georgetown, MA (US); Michael Baier, Medway, MA (US); Anup Pillai, Lowell, MA (US); Ameya Shendye, West Haven, CT (US)

(73) Assignee: University of Massachusetts, Boston, MA (US)

( * ) Notice: Subject to any disclaimer, the term of this patent is extended or adjusted under 35 U.S.C. 154(b) by 1175 days.

(21) Appl. No.: 12/441,935

(22) PCT Filed: Sep. 19, 2007

(86) PCT No.: PCT/US2007/020362
§ 371 (c)(1),
(2), (4) Date: Mar. 8, 2010

(87) PCT Pub. No.: WO2008/153539
PCT Pub. Date: Dec. 18, 2008

(65) Prior Publication Data
US 2010/0172548 A1    Jul. 8, 2010

Related U.S. Application Data

(60) Provisional application No. 60/840,550, filed on Sep. 19, 2006.

(51) Int. Cl.
*G06K 9/00* (2006.01)

(52) U.S. Cl.
USPC .................................. 382/124; 382/115

(58) Field of Classification Search
USPC ................. 382/115, 118, 124, 127, 154
See application file for complete search history.

(56) References Cited

U.S. PATENT DOCUMENTS

| | | | |
|---|---|---|---|
| 5,937,557 A | 8/1999 | Bowker et al. | |
| 7,181,052 B2 | 2/2007 | Fujieda | |
| 2001/0026632 A1 | 10/2001 | Tamal | |
| 2002/0097896 A1 | 7/2002 | Kuckendahl | |
| 2002/0146155 A1 | 10/2002 | Mil'shtein et al. | |
| 2003/0012424 A1* | 1/2003 | Franich et al. | 382/154 |
| 2006/0182318 A1 | 8/2006 | Shigeta | |
| 2007/0217663 A1 | 9/2007 | Iizuka | |
| 2008/0008358 A1 | 1/2008 | Miura et al. | |
| 2008/0025460 A1 | 1/2008 | Li | |
| 2008/0056539 A1* | 3/2008 | Sweeney et al. | 382/115 |
| 2009/0185727 A1 | 7/2009 | Beckmann et al. | |

OTHER PUBLICATIONS

Non-Final Office Action for U.S. Appl. No. 12/777,624; Date Mailed: Oct. 11, 2012.
Final Office Action for U.S. Appl. No. 12/777,624 dated Jan. 18, 2013.

* cited by examiner

*Primary Examiner* — Edward Park
(74) *Attorney, Agent, or Firm* — Hamilton, Brook, Smith & Reynolds, P.C.

(57) ABSTRACT

Methods and/or systems for scanning biometric objects and compiling 2-dimensional digital images thereof, such images as can provide enhanced resolution, with reduced distortion.

14 Claims, 8 Drawing Sheets

Figure 6A
Figure 6B
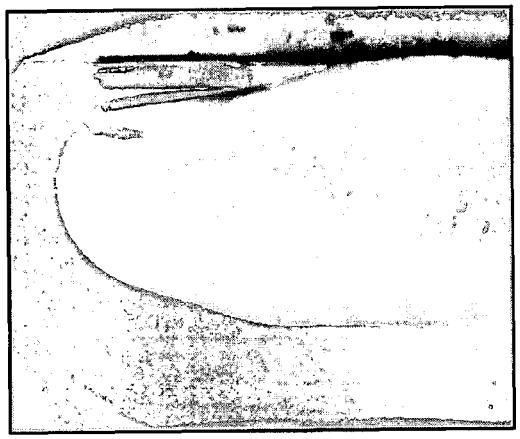
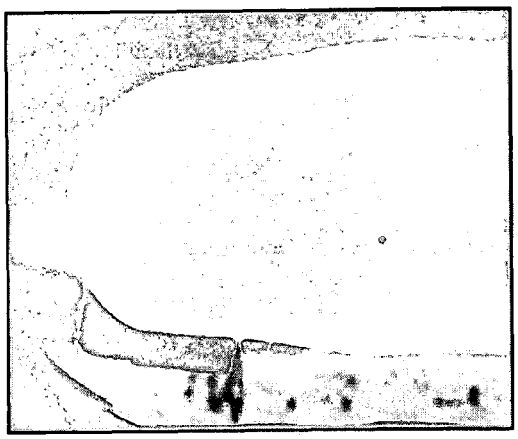
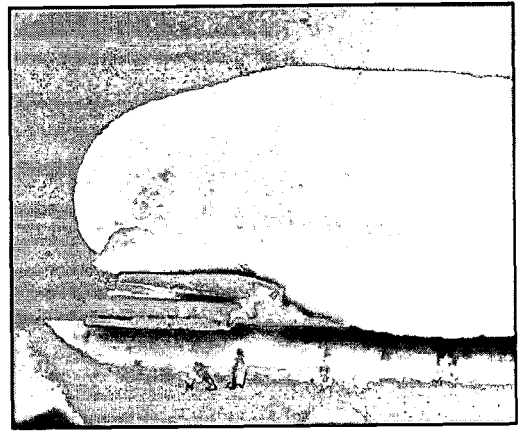
Figure 6C
Figure 6D

CIRCUMFERENTIAL CONTACT-LESS LINE SCANNING OF BIOMETRIC OBJECTS

This application claims priority benefit from provisional application Ser. No. 60/840,550 filed on Sep. 19, 2006, the entirety of which is incorporated herein by reference.

BACKGROUND OF THE INVENTION

Fingerprints and handprints are characterized by a series of ridge-like patterns on the surface of the fingers and palms. Because fingerprints are unique to each person, fingerprint recognition technologies are necessary and integral parts of criminal investigations, and have been used for over 140 years to record and identify individuals based solely on their prints. Beyond use for criminal investigations, fingerprints and other biometrical data are the basis for the design of numerous security systems in the private and public sectors for identification and authentication. Security measures at testing facilities, courthouses, stadiums, borders, and airports have become increasingly more common.

Traditional fingerprinting technologies have consisted of rolling each finger on an ink pad and then rolling the inked finger on a paper form, which is subsequently stored in hardcopy. Newer technologies have taken a direct digital scan of the finger as it is placed against or rolled over a flat scanner, thereby eliminating paper while improving the quality of the image, because comparatively little smudging or smearing occurs, and over- or under-inking is eliminated, increasing the reliability of results. More recently, electronic systems utilizing optical methods to scan fingerprints began to replace wet-ink methods. Optical scanning technologies, which have the ability to capture the entire fingerprint area by rotating the finger from one side to the other as the finger is pressed onto the sensor.

Accordingly, businesses and agencies have started to replace the ink-based technology with inkless technologies where the finger is pressed against the surface of the scanner. Deformation of finger tissue during optical scanning is still significant and causes recognition problems, i.e., reduced reliability of recognition when a finger is pressed against an optical scanner. And as previously mentioned any contact can distort the dimensions of the finger, resulting in a statistically decreased confidence of accuracy. This distortion leads to false positives and negatives, lowering the recognition accuracy rate to approximately 92% (NIJ, "Forensic Sciences: Review of Status and Needs", 173412, (1999)). Furthermore, complex mathematical models to analyze and compare prints are less reliable using questionable ridge pattern data generated from contact methods.

To address the distortion problem resulting from contact fingerprinting, one study attempted to reproduce the pressure gradient across a finger. Using calibrated silicon pressure sensors, the distribution of pressure across a finger was scanned, pixel by pixel, to generate maps of an average pressure distribution during fingerprinting. Although controlled loading of a finger is possible, reproduction of the same distribution of pressure across a given finger during repeated fingerprinting procedures was not observed. The correlation between the stress and strain of a finger under a load was also investigated by comparing images of a finger with no pressure applied and with various pressures applied. The distribution of pressure found on a finger was not only random, but contradicted expected proportional distribution of pressures.

Aside from distortion, existing optical scanning methods are limited in yet another manner. Conventional image correlation techniques are typically performed using Fast Fourier Transforms (FFTs), image shifting, or optical transformation techniques. These techniques require extensive processing of the images in hardware or software and the computational load increases significantly as the image resolution increases, thereby substantially limiting their use.

As a result, various contact-less techniques have been devised. In one, however, contact-less scanning (of a finger) is somewhat problematic as the scan is done by optical collimators around the light source and the optical detector. Spreading of the light coming out through a slit does not provide a sufficiently thin scan. Another describes a contact-less rotational fingerprint imaging system where the optical scanning line is formatted by a cylindrical lens. The inaccuracy of optical slits and lenses in addition to spreading of the optical beam do not allow a sufficiently thin line for adequate resolution. In various other techniques, while contact-less, inadequate scanning (less than 180 degrees), and inadequate resolution for accurate slice alignment both contribute, together or separately, to distortion and decreased accuracy. Further, current technologies have not resolved the "stretching" distortion inherent in projecting a curved surface onto a two-dimensional plane.

Accordingly, there remains an ongoing search in the art for an imaging method and/or system to better utilize the benefits and advantages available through contact-less scanning.

SUMMARY OF THE INVENTION

In light of the foregoing, it is an object of the present invention to provide a contact-less scanning method and/or system to effect such a method, thereby overcoming various deficiencies and shortcomings of the prior art, including those outlined above. It will be understood by those skilled in the art that one or more aspects of this invention can meet certain objectives while one or more other aspects can meet certain other objectives. Each objective may not apply equally, in all its respects, to every aspect of this invention. As such, the following objects can be viewed in the alternative with respect to any one aspect of this invention.

A further goal was to anchor loosely the biometric object without causing its dimensions to distort, while maintaining the object's position during the scanning and imaging process.

A more particular object of the invention is to provide a method that enables the line-scanning of a finger, palm, facial or retina without contacting the finger, palm, face, retina, or other biometric object.

A more particular object of embodiments of the invention is to provide a method for high speed line-scan image acquisition.

A more particular object of the invention is to capture a plurality of line-scan images, each line-scan image approximately one pixel wide.

A more particular object of the invention is to correlate and assemble the plurality of line-scan images into a contiguous composite image capable of being stored.

A more particular object of the invention, alone or in conjunction with one or more of the preceding objectives, is to provide a method employing a correlative, deviation of symmetry function to determine whether two images were captured from the same object.

A more particular object of embodiments of the invention, alone or in conjunction with one or more of the preceding objectives, is to provide a method for extracting minutia of a print from a single line-scan, or a few adjacent line-scans to match to an individual.

A more particular object of embodiments of the invention is to provide the extension of the line scans to partial recognition of details in facial and retinal scanning.

Other objects, features, benefits and advantages of the present invention will be apparent from this summary and the following descriptions of certain embodiments, and will be readily apparent to those skilled in the art having knowledge of various biometric imaging and/or correlation techniques. Such objects, features, benefits and advantages will be apparent from the above as taken into conjunction with the accompanying data, figures and all reasonable inferences to be drawn therefrom.

In part, the present invention can be directed to a method of imaging a 3-dimensional biometric object. Such a method can comprise providing a 3-dimensional biometric object comprising a longitudinal axis; rotating a digital image recorder apparatus about such an axis and periodically scanning at least a portion the surface of such an object, each such scan adjacent one to another and substantially perpendicular to the object surface, to provide a digital image of each scan; and compiling such rotationally scanned digital images into a composite 2-dimensional image of the object surface. In certain embodiments, such an object can be scanned, as described elsewhere herein without contact with such a recorder or any component of a corresponding apparatus. Regardless, in certain such or other embodiments, rotation can be at least about 180° about or around the object.

In certain embodiments, a scanning period can be less than about 5° of such a rotation. From another perspective, each such scan can cover less than about 10 micrometers of the object surface. In certain such embodiments, a scan can comprise less than about 2 micrometers of the object surface. Without limitation, a biometric object can be selected from a human finger, a human palm, a human face, a human retina, together with various other anatomical features which can be used to provide a recognition basis or indicator. In certain embodiments, such an object can be a human finger or a portion of which, providing a fingerprint or partial fingerprint, respectively. In certain such embodiments, a scanning period can be less than about 5° of the aforementioned rotation. From another perspective, each such scan can cover less than about a dimensional aspect of a ridge of a fingerprint.

In certain embodiments, such a method can comprise storage of a composite image in a database of stored images. In certain such embodiments, such a method can comprise comparing a stored or registered image to another image of a biometric object, regardless of method previously recorded, such a previous image can be inked, optically scanned and/or obtained from an extraneous field or environment (e.g., without limitation, a crime scene, etc.).

In certain other embodiments, such a method can comprise correlating a stored image with a presently compiled composite image, for purposes relating but not limited to subject identification, recognition and/or security clearance.

In part, the present invention can also be directed to a method of using a digital linear scan to 2-dimensionally image a 3-dimensional biometric object. Such a method can comprise providing a 3-dimensional biometric object comprising a longitudinal axis; rotationally scanning and digitally imaging a surface of the object, with scanning over at least about 180° about the object axis and without contact therewith, such a rotation providing a plurality of linear scans, with each scan adjacent one to another and substantially perpendicular to the object surface, each such image dimensioned less than about 2 micrometers; and compiling the scanned digital images into a stored composite 2-dimensional image of the object surface.

As discussed above, such a method is non-limiting with respect to a biometric object. However, representative of broader application relating to this invention, one such object can be a human finger or a portion thereof, providing a fingerprint or a partial fingerprint, respectively. Regardless, each such scan can cover less than about 2 micrometers of the finger surface, with corresponding image dimension. As discussed above and illustrated in more detail below, such a method can comprise comparing such a stored image to another or an extraneous fingerprint image, and/or correlating such a stored image with a presently compiled composite fingerprint image, such as for but not limited to subject identification, recognition, etc.

In part, the present invention can be directed to a digital system for capture and correlation of biometric data. Such a system can comprise a biometric object enclosure compartment for position of a biometric object, the enclosure compartment comprising an object entry and coupled to a line scan digital camera with an arm component rotational thereabout; an assembly comprising a motor component, a driver component and controller component, with such a controller component interfaced with the biometric object enclosure compartment, the rotational arm component and the digital camera; and a captured image database interfaced with such a digital camera.

In certain embodiments, as illustrated below, the object enclosure compartment of such a system can define an object view port/opening. For such a system comprising an object positioning camera, such a component can be aligned with a view port/opening, and the positioning camera can be interfaced with the controller component. Regardless, the object enclosure compartment can comprise a contact-less object positioning component, of the type described or referenced herein. Where such a component is utilized, an object positioning camera can be aligned therewith. Regardless, as can be applicable to a range of such embodiments, a line scan can be dimensioned to be about the width of a pixel. In certain such embodiments, where a biometric object is a finger or a portion thereof, such a line scan can cover less than about the dimension of a ridge of a corresponding fingerprint.

BRIEF DESCRIPTION OF THE DRAWINGS

FIGS. 6A-D provides four digital image views, compiled in accordance with this invention.

DETAILED DESCRIPTION OF CERTAIN EMBODIMENTS

Figure 1:
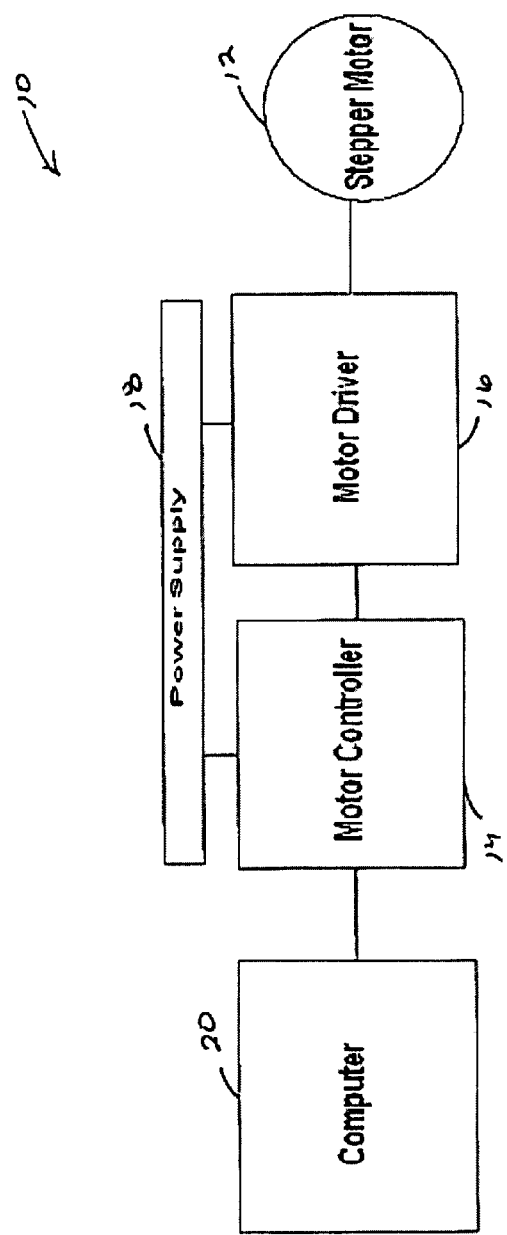
FIG. 1 is a schematic block diagram of a non-limiting electro/mechanical component useful in conjunction with the methods/systems of this invention.

Methods and/or systems for the rotational scanning, capture of line-scans, image comparison, correlation into a composite image, and extraction of minutia from biometrical data and data patterns disclosed herein are subject to a wide variety of non-limiting embodiments. However, to ensure that one skilled in the art will be able to understand and, in appropriate cases, practice the present invention, certain preferred embodiments of the broader invention revealed herein are described below and schematically illustrated in the accompanying figures.

The shape of a finger is approximately cylindrical. By rotating a camera around the longitudinal axis of, for example, a finger, a series of images can be produced, each of which is captured from a slightly different angle, though perpendicular to the image or "line-scan" recorded. Although no individual image contains the entire fingerprint, by taking an appropriately sized slice, or line-scan, from the center of each picture and assembling the slices, the entire fingerprint region can be captured. Rotational fingerprinting of this invention can be compared favorably to existing contact-less technology of the prior art, on at least three bases.

First, the area seen is larger than previously scanned. As opposed to an image of the bottom of a finger, as is typical, the entire fingerprint region of the finger can be captured, which amounts to roughly twice the scannable area. Likewise, more minutia is captured.

Second distortion is reduced. A camera is perpendicular to the region of interest on the finger when creating a rotational compilation, and the spacing between ridges shows far less distortion as compared to the non-rotational scheme. In particular, a benefit of this property can be realized in automated fingerprint recognition. Further, in comparison with contact-less optical systems, the present rotational system eliminates errors created by non-controlled, random positioning of the finger during a registration/recording procedure versus positioning during a subsequent checking procedure. In addition, the distortion problem of the spacing and location of ridges due to variations in pressure as the fingerprint is taken, as with prior art inventions, is substantially eliminated by the present contact-less approach. With a greater than 180 degree view, contact-less fingerprinting allows capture of the entire fingerprint region, without projection-induced distortion. To avoid contact, the present invention can employ an apparatus that allows loose fixturing rather than strongly restricting the movement of the fingers, a further advancement of the art over previous methods, where compressing the fingers resulted in distortion, and a higher percentage of recognition errors.

Third, any contact method of imaging inherently incorporates some interference of the object, e.g., from smudging of the image, such as smudging created from body oils or other contaminants on the surface of the biometric object. A non-contact aspect of this invention eliminates smudging and the oily trace of a previously examined finger.

One problem associated with previous rotational methods is that portions of some biometric objects are not or cannot always be perpendicular to the camera. Distortions due to the perspective of the camera are manifested through the misalignment of ridges between adjoining slices. For example, some slight misalignment of the ridges from slice to slice can be seen, especially towards the tip of the finger, due to curvature of the finger along the finger length. A perpendicular relationship between the camera and the finger can not be maintained in this case. However, taking infinitesimally and/or increasingly small slices (dimensioned as narrow as a single pixel) eliminates this misalignment, instead of replacing it with a "stretching" caused by the projection of the curved surface onto a flat plane. Any distortion interest to the present invention is much smaller than the 20% distortion seen in contact based methods. Resultant stretching typically amounts to less than the width of a ridge, except at the extreme finger tip where curvature is severe.

Better and more accurate recognition results can be anticipated using this scanning method/system. To narrow the possibility of false rejection, the present invention also contemplates use of a deviation from the symmetry of correlation functions algorithm (as opposed to an FFT, image-shifting or other correlative techniques) to correlate the line-scan images received by the microprocessor from the digital camera. Such an algorithm showed results with 1.53% false rejections and 0.51% false recognition of fingers, raising the success rate to 97.96%. Using such methods and apparatus, distortion of features of the biometric object and distortion of the images acquired from them are substantially reduced or eliminated. Accordingly, fewer recognition errors—both false positive and false negative—occur.

As described below, with respect to one method/system a finger was scanned along its circumference and a greater than 180 degree view was developed. Using a camera, which rotated around the finger while the finger was stationary, small slices of the entire image of the finger were acquired. Equal sized slices of the image were processed with a program assembling the 180+ degree view of the finger. Comparison of two images of the same fingerprint (i.e., the registered/shared and actual/present images), is performed by the deviation of symmetry of correlation function. Such a method provides the first contact-less optical line-scanning technique where the 180+ degree image is compiled from very thin scanning lines (e.g., less than about 10-20 micrometers and/or about one pixel wide). The full view of one finger or another biometric object can be captured in approximately one second.

In another related embodiment of the invention, a method, apparatus and/or system for computing correlating images for image recognition is provided. In particular, such an embodiment can be used to compare stored images of a biometric object to verify whether an individual is the person claimed to be. Such a method can use a deviation of symmetry correlation function to determine whether the images are of a same object. The correlation functions present the intensity fluctuations recorded along given directions (x or y), across an object. A resulting bell shaped correlation curve has specific symmetry, when taken across given area of a subject fingerprint during registration procedure. This curve should have repeated symmetry during recognition procedure. Deviation of symmetry of more than about 3% indicates that two compared biometrical objects are not the same. Such techniques, as can be used in conjunction with this invention, are described more fully in U.S. Pat. No. 6,961,449, in pertinent part including but not limited to the figures and corresponding discussion, such patent incorporated herein by reference in its entirety.

Figure 4:
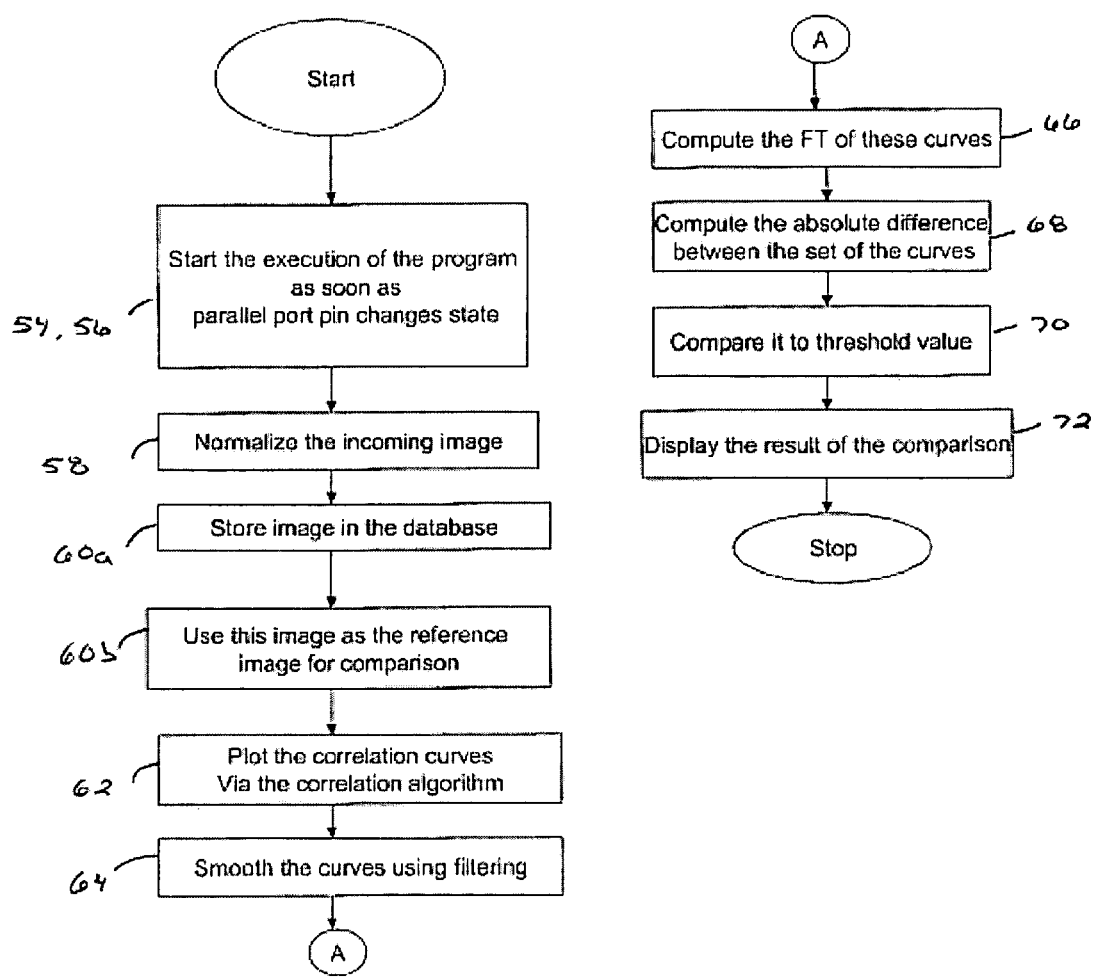
FIG. 4 provides a flow diagram schematically illustrating various non-limiting steps, functional aspects, and/or considerations relating to this invention.

One or more of the preceding aspects and considerations can relate to one or more embodiments of this invention, such aspects and considerations as can be understood in the context of one or more of the following figures. For instance, with reference to FIG. 1, electrical system 10 can comprise a stepper motor 12 used for the rotation of the arm on which the camera is mounted. The length of the arm can be adjusted according to requirements. An assembly of motor controller 14, driver 16 and supply 18 is used to drive the stepper motor. The motor controller is programmed to control the motor as required. According to the program, the motor controller 14 sends signals to the driver 16 which in turn drives the motor 12. The motor controller is interfaced to a parallel port of a computer 20. The motor controller reacts to the status of the pins on the parallel port. The status of the parallel port is controlled by a microprocessor also programmed to acquire images from the line scan camera and store them in a database. (Reference is made to FIG. 4.)

Figure 2:
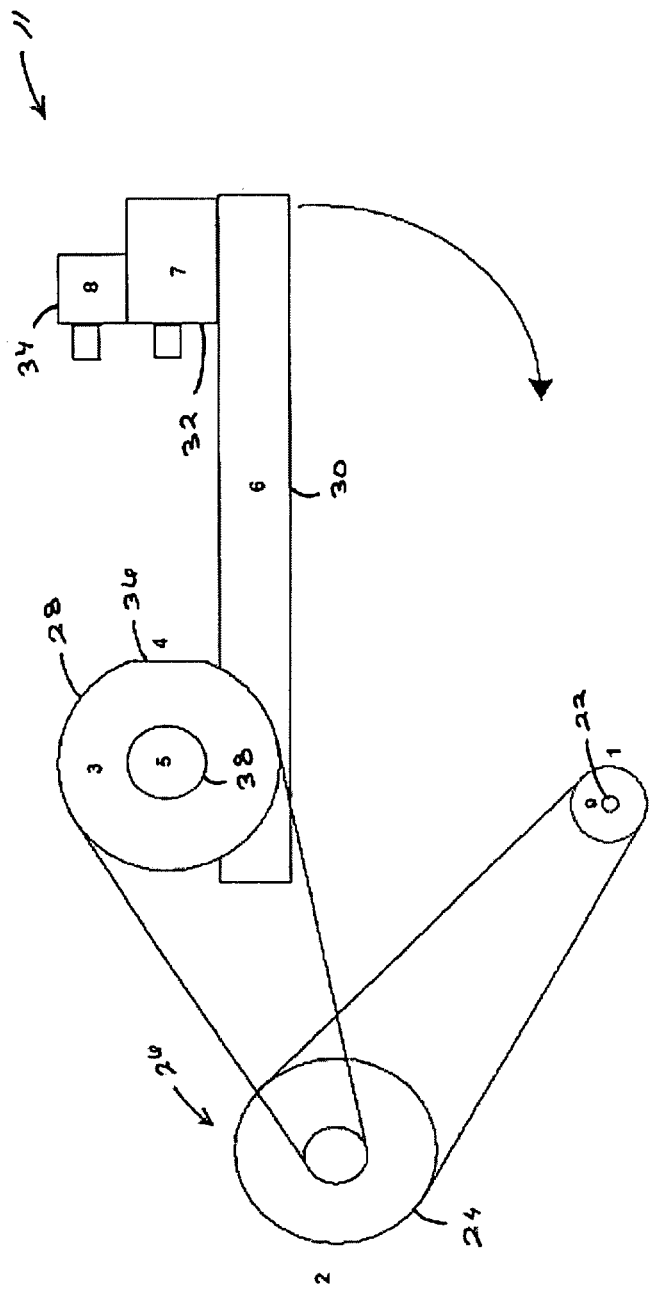
FIG. 2 is a schematic diagram of a non-limiting component configuration, as can be used in conjunction with a present method or system, in accordance with this invention.

With reference to FIG. 2 and an apparatus and/or system 11, the shaft 22 of the stepper motor 12 is attached to a pulley arrangement 24 with variable gear ratios 26 that can be adjusted as required. This pulley arrangement is coupled to the finger enclosure cylinder 28. Finger enclosure 28 is attached to an adjustable lever arm 30 at one end. The other end of the adjustable lever arm has a line scan camera 32 and a finger position camera 34 on top of it. The finger enclosure 28 has a camera opening 36 to provide both of the cameras a view of the subject finger. The finger position 34 camera allows the user to view the finger and keep it aligned at the time of rotation. A finger hole 38 is provided for the user to insert his/her finger.

Figure 3:
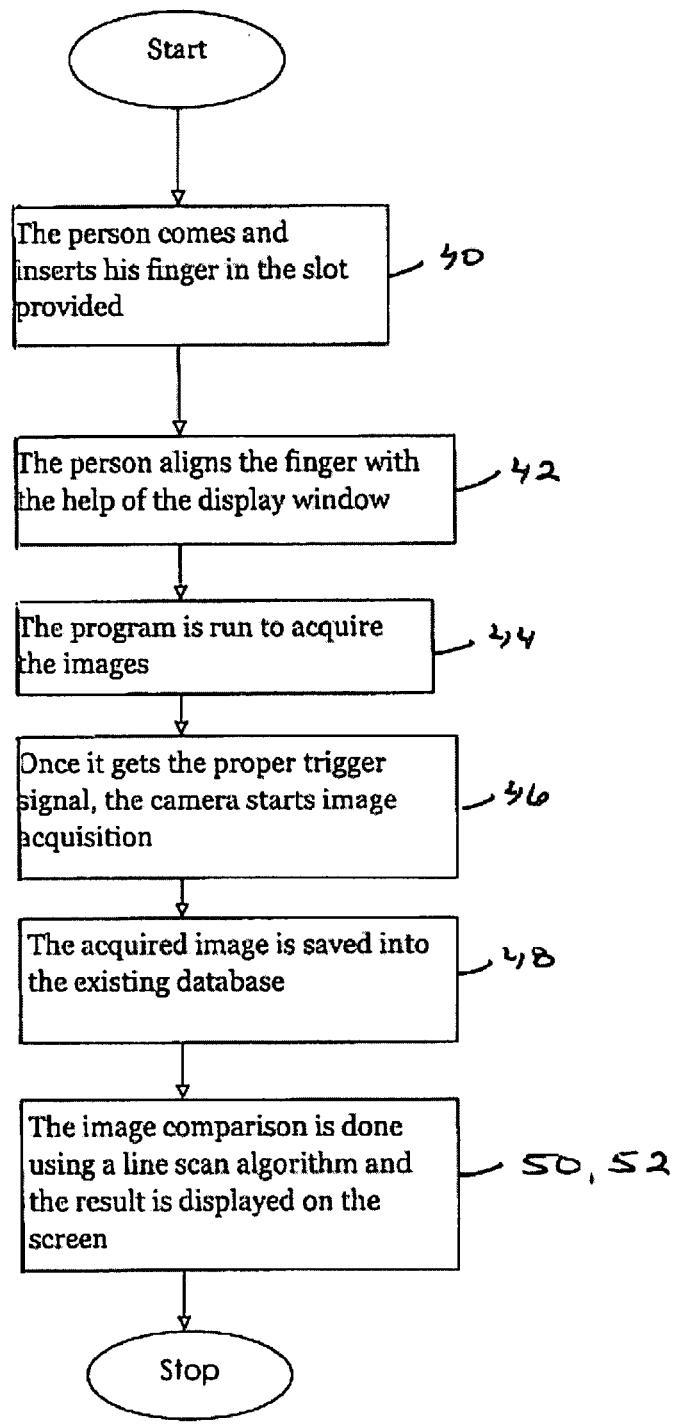
FIG. 3 provides a flow diagram illustrating various steps and/or components of one or more non-limiting embodiments of this invention.

With reference to FIG. 3, the person inserts 40 their finger in the finger hole. The finger position camera (FIG. 2, at 34) displays the position of the finger inside the finger enclosure (28) and allows the person to align 42 their finger correctly. When the finger is aligned, the programmed stepper motor is initiated 44. The line scan camera (32) simultaneously receives proper triggering signals 46 to acquire the fingerprint image. When the image is acquired, it is stored 48 in a database which consists of previously stored images. Then, in accordance with certain correlation and recognition embodiments, a line scan algorithm is executed which compares 50 this recently acquired image with the rest of the images in the database and determines 52 whether or not the image is recognized.

More particularly, to describe one or more embodiments, when the image is acquired by the line scan camera and stored in the database, the status of a parallel port pin changes. The program which continuously probes the status of this pin initializes 54 as soon as the status changes 56. The acquired image is stored 60a as the reference image 60b, normalized 58 to ensure that all images contain only necessary, similar information. At any place in the image 20-25 pixel thick lines are taken to generate the correlation function 62 and cross correlation curves are plotted for both the acquired and already present images. A type of Golay filtering 64 is done in order to smooth the curves. A Fourier transform 66 is computed from these curves and the absolute difference 68 is compared 70 to a threshold value. The result is displayed 72, whether or not there is image correlation or recognition.

Figure 5:
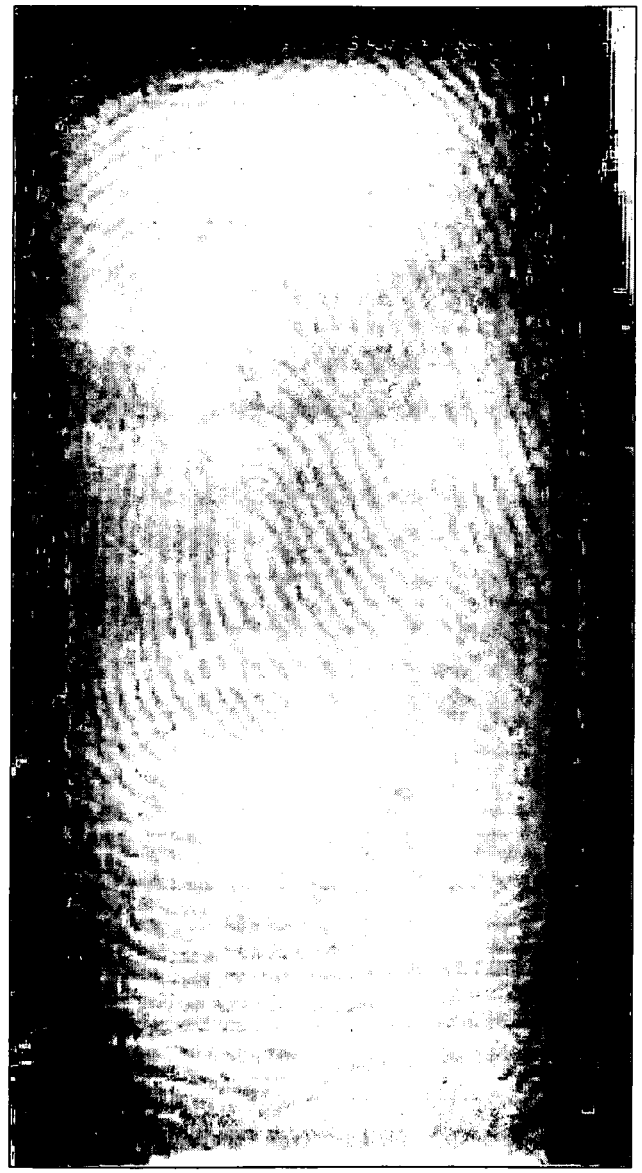
FIG. 5 provides a digital image illustrating use of a contact-less positioning component, in accordance with certain embodiments of this invention.

As discussed above, the present methods/systems can be contact-less, to reduce surface deformation and enhance recognition reliability. Accordingly, the aforementioned object enclosure compartment can be arranged and configured to include a contact-less positioning component for scanning, to allow loose alignment with respect to a particular scanning apparatus. The use and configuration of such a component, in conjunction with such a scanning system/apparatus is as would be understood by those skilled in the art made aware of this invention. In particular, such a positioning component and/or apparatus is described in U.S. Pat. No. 7,031,502 in pertinent part including but not limited to the figures and corresponding discussion, such patent incorporated herein by reference in its entirety. FIG. 5 provides a digital image of a finger, acquired using such a contact-less positioning component. Absent pressure on the finger, of the sort typical with prior art technologies, distortion is reduced and high resolution can be obtained.

Using such a contact-less component configuration, a subject finger was scanned as described above and schematically illustrated in the corresponding figures. In particular, a black and white video camera was rotated around a finger, at an appropriate distance. Sixty-two steps were taken across a rotation of about 200° around the longitudinal axis of the finger. Representative digital images compiled from the 62 scans taken are provided in FIGS. 6A-D. Thin scans, each comprising about 3° of rotation were compiled to form the digital image provided in FIG. 7. Short white lines, used a demarcation points of the individual scans are evident to the left of the image. At the top and bottom of the image, two opposing edges of the fingernail can be seen. Central to the image, the core of the fingerprint is provided with excellent resolution. Slight variations in image brightness from scan to scan may be an artifact of an automatic gain adjustment component present on the particular video camera utilized, and can be easily remedied.

Figure 7:
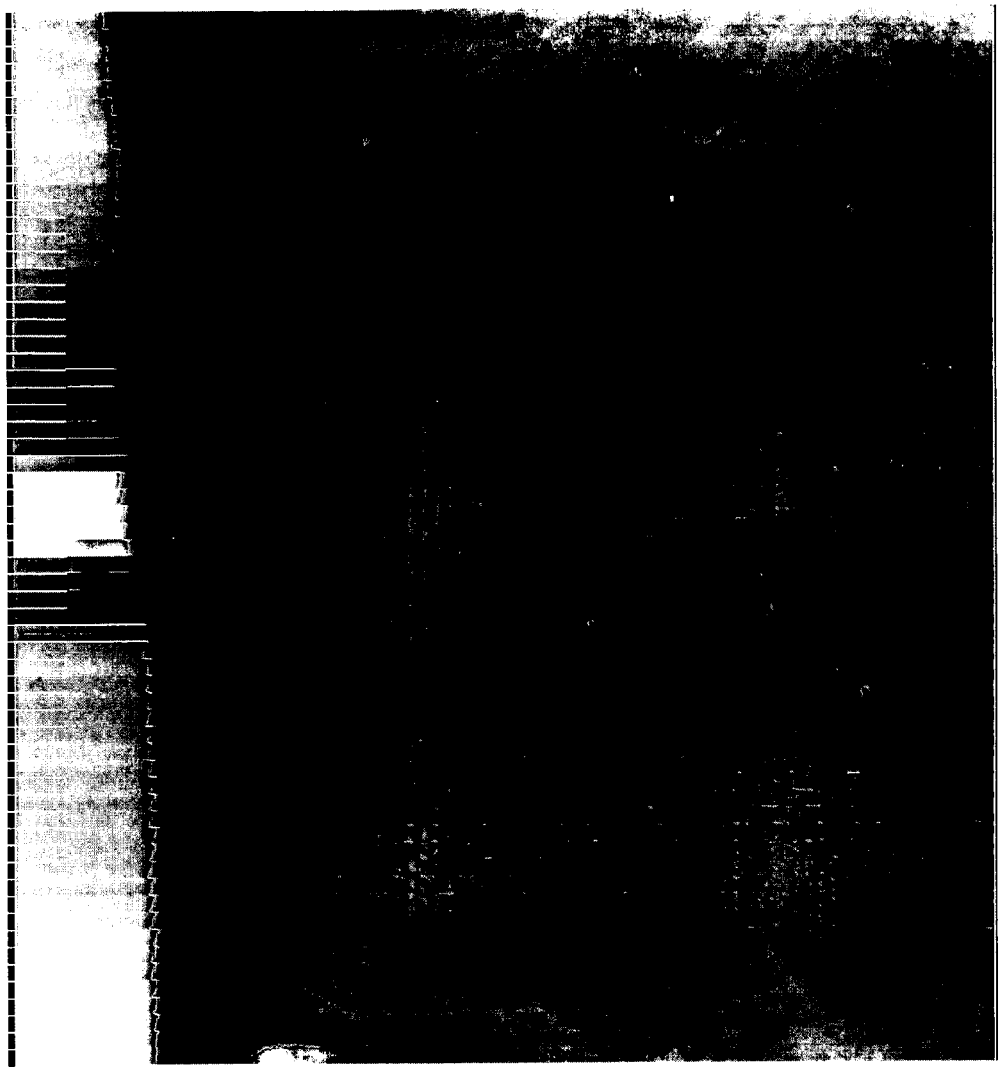
FIG. 7 provides a digital image compiled, as described herein, illustrating certain features and benefits available through use of this invention.
Figure 8:
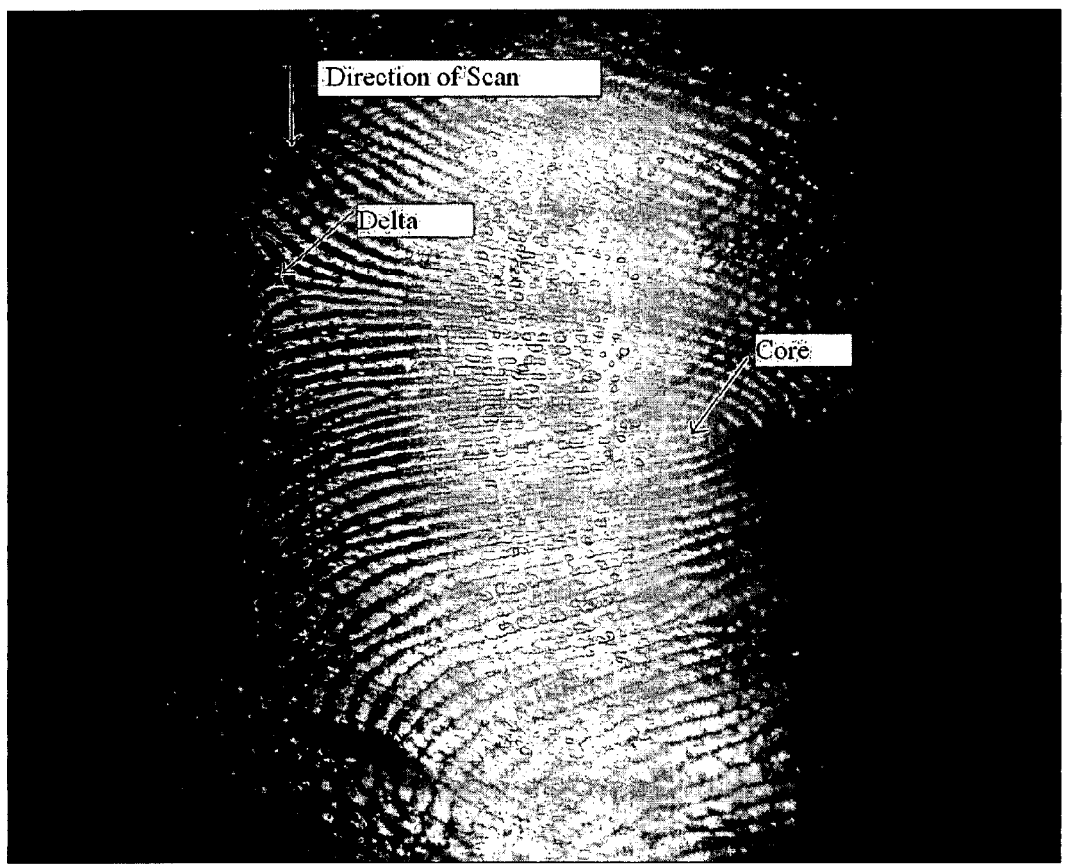
FIG. 8 provides a digital image of a partial fingerprint taken in a line scan mode.

With reference to FIG. 7, slight misalignment of the ridges from scan to scan are evident toward the fingertip. Such an effect may be minimized with continued improvements in mechanical design, toward a more robust system. Nonetheless, finger curvature along its length precludes a consistent perpendicular relationship between camera and finger, from scan to scan. Even so, the results evident in FIG. 7 (and FIG. 8, an image of a partial fingerprint) show but one benefit of the present invention: increasingly small scans, of the sort described herein, approaching a pixel length scale significantly reduce misalignment. Any residual distortion due to curvature is unexpectedly and surprisingly smaller than the 20° distortion typically resulting from contact-based methods of the prior art.

With certain details and embodiments of the present invention for methods for the rotational scanning, capture of line-scans, correlation into a composite image, and extraction of minutia from biometrical data and data patterns disclosed, it will be appreciated by one skilled in the art that numerous changes and additions could be made thereto without deviating from the spirit or scope of the invention. This is particularly true when one bears in mind that the presently described embodiments merely exemplify the broader invention revealed herein. Accordingly, it will be clear that those with major features of the invention in mind could craft embodiments that incorporate those major features while not incorporating all of the features included in the described embodiments described herein.

While the principles of this invention have been described in conjunction with specific embodiments, it should be understood clearly that these descriptions are added only by way of example and are not intended to limit, in any way, the scope of this invention. For instance, the aforementioned mechanical, electrical and/or computer/microprocessor components described above are non-limiting with respect to the methods, apparatus and/or systems of this invention. As would be understood by those skilled in the art, various other such components are available, limited only by results achieved in accordance herewith. As such, various other circuit and/or component configurations can be used to achieve the scanning effects described herein. Likewise, various other digital image recorders and/or digital cameras can be used with comparable effect. Moreover, various other biometric objects can be subject to the present methods and/or systems with corresponding modifications to various components (e.g., enclosure components and/or object positioning components) and configurations thereof. Other advantages and features will become apparent from the claims hereinafter, with the scope of such claims as can be determined by a reasonable equivalents as would be understood by those skilled in the art.

We claim:

1. A method of imaging a 3-dimensional biometric object, said method comprising:
    providing a 3-dimensional biometric object, said object comprising a longitudinal axis;
    rotating a digital image recorder apparatus at least about 180° about said axis of said biometric object and periodically line-scanning at least a portion of an object surface of the biometric object with a scanning period of less than about 5° of the rotating of the recorder apparatus for each line-scan, said scanning without contact between said biometric object and said recorder apparatus, each said scan adjacent one to another and perpendicular to said object surface, to provide a digital image of each said line-scan; and
    compiling said rotationally scanned digital images into a composite 2-dimensional image of said object surface.

2. The method of claim 1 wherein each said scan is less than about 10 micrometers of said object surface.

3. The method of claim 2 wherein said scan comprises less than about 2 micrometers of said object surface.

4. The method of claim 1 wherein said biometric object is selected from a human finger, a human palm, a human face and a human retina.

5. The method of claim 4 scanning at least a portion of a human finger.

6. The method of claim 5 wherein each said scan comprises less than about the dimension of a ridge of a fingerprint.

7. The method of claim 1 wherein said composite image is stored in a database of stored images.

8. The method of claim 7 comparing a said stored image to one of an inked image of a biometric object, an optical scan image of a biometric object, and a field image of a biometric object.

9. The method of claim 7 correlating a said stored image with a present compiled composite image.

10. A method of using a digital line scan to 2-dimensionally image a 3-dimensional biometric object, said method comprising;
    providing a 3-dimensional biometric object, said object comprising a longitudinal axis;
    rotationally scanning and digitally imaging a surface of said object, said scanning over at least about 180° about said object axis and without contact with said object, said rotation providing a plurality of line scans, each said scan adjacent one to another and perpendicular to said object surface, each said image dimensioned less than about 2 micrometers; and
    compiling said scanned digital images into a stored composite 2-dimensional image of said object surface.

11. The method of claim 10 wherein said biometric object is selected from a human finger, a human palm, a human face and a human retina.

12. The method of claim 11 scanning at least a portion of a human finger, and each said image is dimensioned less than about 2 micrometers.

13. The method of claim 12 comparing said stored image to one of a fingerprint image generated with wet-ink, an optical scan fingerprint image and a field fingerprint image.

14. The method of claim 12 correlating said stored image with a latent compiled composite fingerprint image.

* * * * *